(12) United States Patent
Takahashi et al.

(10) Patent No.: US 8,843,756 B2
(45) Date of Patent: Sep. 23, 2014

(54) IMAGE PROCESSING APPARATUS AND IMAGE PROCESSING METHOD

(75) Inventors: Jun Takahashi, Kawasaki (JP); Shohei Nakagata, Kawasaki (JP); Kensuke Kuraki, Kawasaki (JP); Taizo Anan, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 825 days.

(21) Appl. No.: 12/292,955

(22) Filed: Dec. 1, 2008

(65) Prior Publication Data
US 2009/0257586 A1 Oct. 15, 2009

(30) Foreign Application Priority Data

Mar. 21, 2008 (JP) ................................ 2008-074671

(51) Int. Cl.
| | | |
|---|---|---|
| G06F 21/00 | (2013.01) | |
| G06F 11/07 | (2006.01) | |
| H04N 3/14 | (2006.01) | |
| H04N 5/232 | (2006.01) | |
| G06T 7/20 | (2006.01) | |
| G06T 7/00 | (2006.01) | |
| G06K 9/00 | (2006.01) | |

(52) U.S. Cl.
CPC ............ *G06F 21/00* (2013.01); *G06F 11/0733* (2013.01); *H04N 3/155* (2013.01); *H04N 5/23229* (2013.01); *H04N 5/23254* (2013.01); *G06T 7/20* (2013.01); *G06T 7/0085* (2013.01); *G06T 7/00* (2013.01); *G06T 7/0079* (2013.01); *G06T 7/0081* (2013.01); *G06T 7/0083* (2013.01); *G06T 7/2033* (2013.01); *G06K 9/00* (2013.01)

USPC ........... 713/184; 358/538; 382/164; 382/171; 382/175; 382/180

(58) Field of Classification Search
CPC ..... G06F 21/00; G06F 11/0733; H04N 3/155; G06T 7/0079; G06K 9/0002
USPC .................. 713/184; 382/164, 171, 175, 180; 358/538
See application file for complete search history.

(56) References Cited

U.S. PATENT DOCUMENTS

| | | | |
|---|---|---|---|
| 4,459,611 A | | 7/1984 | Arai et al. |
| 5,058,162 A | * | 10/1991 | Santon et al. .................. 705/51 |

(Continued)

FOREIGN PATENT DOCUMENTS

| | | |
|---|---|---|
| JP | 8-179689 | 7/1996 |
| JP | 9-504660 | 5/1997 |

(Continued)

OTHER PUBLICATIONS

Ravishankar et al., "Region Based Selective Image Encryption", 2006.*

(Continued)

*Primary Examiner* — Ondrej Vostal
(74) *Attorney, Agent, or Firm* — Fujitsu Patent Center

(57) ABSTRACT

An image processing apparatus sections an image to be processed into a plurality of blocks, rearranges the blocks into positions specified by an encryption key that uniquely specifies the positions of the blocks in the image, determines a computing method used to convert pixel values of pixels that form a minimum area included in each of the blocks after the blocks are rearranged based on the pixel values of predetermined pixels that do not belong to the minimum area, and converts the pixel values based on the computing method.

14 Claims, 14 Drawing Sheets

(56) References Cited

U.S. PATENT DOCUMENTS

| | | | | |
|---|---|---|---|---|
| 5,073,953 | A * | 12/1991 | Westdijk | 382/176 |
| 5,091,963 | A * | 2/1992 | Litt et al. | 382/149 |
| 5,208,857 | A | 5/1993 | Lebrat | |
| 5,287,203 | A | 2/1994 | Namizuka | |
| 5,448,688 | A * | 9/1995 | Hemingway | 345/441 |
| 5,491,563 | A * | 2/1996 | Pomerantz | 358/405 |
| 5,548,648 | A * | 8/1996 | Yorke-Smith | 713/193 |
| 5,586,200 | A * | 12/1996 | Devaney et al. | 382/232 |
| 5,600,732 | A * | 2/1997 | Ott et al. | 382/112 |
| 5,680,479 | A * | 10/1997 | Wang et al. | 382/176 |
| 5,872,864 | A * | 2/1999 | Imade et al. | 382/176 |
| 5,956,430 | A * | 9/1999 | Kunitake et al. | 382/246 |
| 5,982,953 | A * | 11/1999 | Yanagita et al. | 382/294 |
| 6,215,914 | B1 * | 4/2001 | Nakamura et al. | 382/284 |
| 6,473,531 | B1 * | 10/2002 | Kunitake | 382/239 |
| 6,516,097 | B1 * | 2/2003 | Pritt | 382/256 |
| 6,587,593 | B1 * | 7/2003 | Matsuoka et al. | 382/260 |
| 6,603,880 | B2 * | 8/2003 | Sakamoto | 382/173 |
| 6,636,630 | B1 * | 10/2003 | Adachi et al. | 382/176 |
| 6,658,156 | B1 * | 12/2003 | Aritomi | 382/239 |
| 6,704,448 | B1 * | 3/2004 | Hasegawa | 382/173 |
| 6,978,042 | B1 * | 12/2005 | Shin et al. | 382/164 |
| 7,016,552 | B2 * | 3/2006 | Koyama | 382/289 |
| 7,031,517 | B1 * | 4/2006 | Le et al. | 382/173 |
| 7,075,944 | B1 * | 7/2006 | Takagi | 370/470 |
| 7,171,019 | B2 * | 1/2007 | Miyake et al. | 382/100 |
| 7,190,396 | B2 * | 3/2007 | Sasaki | 348/254 |
| 7,295,711 | B1 * | 11/2007 | Ahuja et al. | 382/225 |
| 7,352,897 | B2 * | 4/2008 | Luo et al. | 382/171 |
| 7,583,851 | B2 * | 9/2009 | Kudo et al. | 382/254 |
| 7,616,814 | B2 * | 11/2009 | Wolf et al. | 382/176 |
| 7,646,937 | B2 * | 1/2010 | Hasuike | 382/295 |
| 7,653,242 | B2 * | 1/2010 | Haque | 382/173 |
| 7,672,022 | B1 * | 3/2010 | Fan | 358/474 |
| 7,848,572 | B2 * | 12/2010 | Misawa | 382/176 |
| 7,991,224 | B2 * | 8/2011 | Andrew et al. | 382/164 |
| 8,020,117 | B2 * | 9/2011 | Yahata et al. | 715/840 |
| 8,165,217 | B2 * | 4/2012 | Kitajima | 375/240.24 |
| 8,228,561 | B2 * | 7/2012 | Stevens | 382/176 |
| 2002/0037103 | A1 * | 3/2002 | Hong et al. | 382/173 |
| 2002/0122133 | A1 * | 9/2002 | Ejima | 348/362 |
| 2002/0131495 | A1 * | 9/2002 | Prakash et al. | 375/240.08 |
| 2004/0012543 | A1 * | 1/2004 | He | 345/30 |
| 2004/0017579 | A1 * | 1/2004 | Lim | 358/1.9 |
| 2004/0130546 | A1 * | 7/2004 | Porikli | 345/423 |
| 2004/0264781 | A1 * | 12/2004 | Eschbach et al. | 382/226 |
| 2005/0031203 | A1 * | 2/2005 | Fukuda | 382/176 |
| 2005/0180625 | A1 * | 8/2005 | Heittmann et al. | 382/159 |
| 2005/0244053 | A1 * | 11/2005 | Hayaishi | 382/164 |
| 2005/0279821 | A1 * | 12/2005 | Otsuka et al. | 235/375 |
| 2006/0078156 | A1 * | 4/2006 | Varekamp et al. | 382/100 |
| 2006/0132849 | A1 * | 6/2006 | Kakutani | 358/3.06 |
| 2006/0193524 | A1 * | 8/2006 | Tarumoto et al. | 382/232 |
| 2006/0262861 | A1 * | 11/2006 | Kobayashi | 375/240.24 |
| 2006/0288372 | A1 * | 12/2006 | Harada et al. | 725/53 |
| 2007/0003138 | A1 * | 1/2007 | Hobson et al. | 382/173 |
| 2007/0019849 | A1 * | 1/2007 | Kaufman et al. | 382/128 |
| 2007/0083467 | A1 | 4/2007 | Lindahl et al. | |
| 2007/0268372 | A1 * | 11/2007 | Kondo et al. | 348/208.4 |
| 2008/0043840 | A1 * | 2/2008 | Song | 375/240.11 |
| 2008/0075363 | A1 * | 3/2008 | Matsuzaki et al. | 382/162 |
| 2008/0092162 | A1 * | 4/2008 | Lundy et al. | 725/35 |
| 2008/0112613 | A1 * | 5/2008 | Luo et al. | 382/167 |
| 2008/0123848 | A1 * | 5/2008 | Qiu et al. | 380/245 |
| 2008/0137866 | A1 * | 6/2008 | Yang | 380/277 |
| 2008/0152259 | A1 * | 6/2008 | Burns et al. | 382/284 |
| 2008/0205747 | A1 * | 8/2008 | Kuchii | 382/149 |
| 2008/0260226 | A1 * | 10/2008 | Moriya | 382/128 |
| 2008/0278633 | A1 * | 11/2008 | Tsoupko-Sitnikov et al. | 348/699 |
| 2008/0310717 | A1 * | 12/2008 | Saathoff et al. | 382/173 |
| 2009/0003672 | A1 * | 1/2009 | Maier et al. | 382/128 |
| 2009/0022360 | A1 * | 1/2009 | Bradley et al. | 382/100 |
| 2009/0028435 | A1 * | 1/2009 | Wu et al. | 382/190 |
| 2009/0051979 | A1 * | 2/2009 | Tai et al. | 358/463 |
| 2009/0067677 | A1 * | 3/2009 | Nobori et al. | 382/107 |
| 2009/0080647 | A1 * | 3/2009 | Mantin et al. | 380/29 |
| 2009/0110194 | A1 * | 4/2009 | Athsani et al. | 380/200 |
| 2009/0169075 | A1 * | 7/2009 | Ishida et al. | 382/128 |
| 2009/0220161 | A1 * | 9/2009 | Suzuki | 382/233 |
| 2009/0323950 | A1 * | 12/2009 | Nakagata et al. | 380/243 |
| 2010/0119067 | A1 * | 5/2010 | Yoshio et al. | 380/243 |
| 2010/0272357 | A1 * | 10/2010 | Maxwell et al. | 382/173 |
| 2010/0329334 | A1 * | 12/2010 | Kim et al. | 375/240.12 |

FOREIGN PATENT DOCUMENTS

| | | | |
|---|---|---|---|
| JP | 2963472 | 8/1999 | |
| JP | 3609097 | 10/2004 | |
| JP | WO 2008/146390 A1 * | 12/2008 | H04N 1/387 |
| WO | 2006/134517 A2 | 12/2006 | |

OTHER PUBLICATIONS

Ou et al., "Region-based Selective Encryption for Medical Imaging", 2007.*

Cao et al., "Medical image security in a HIPAA mandated PACS environment", 2002.*

Wintz, "Transform Picture Coding", IEEE, 1972.*

Anderson et al., "Adaptive Image Segmentation", 1988.*

Yau et al., "A Texture Mapping Approach to 3-D Facial Image Synthesis", 1988.*

Lagattu et al., "In-plane strain measurements on a microscopic scale by coupling digital image correlation and an in situ SEM technique", 2005.*

Extended European Search Report dated Jun. 29, 2009 and issued in corresponding European Patent Application 08020727.7.

* cited by examiner

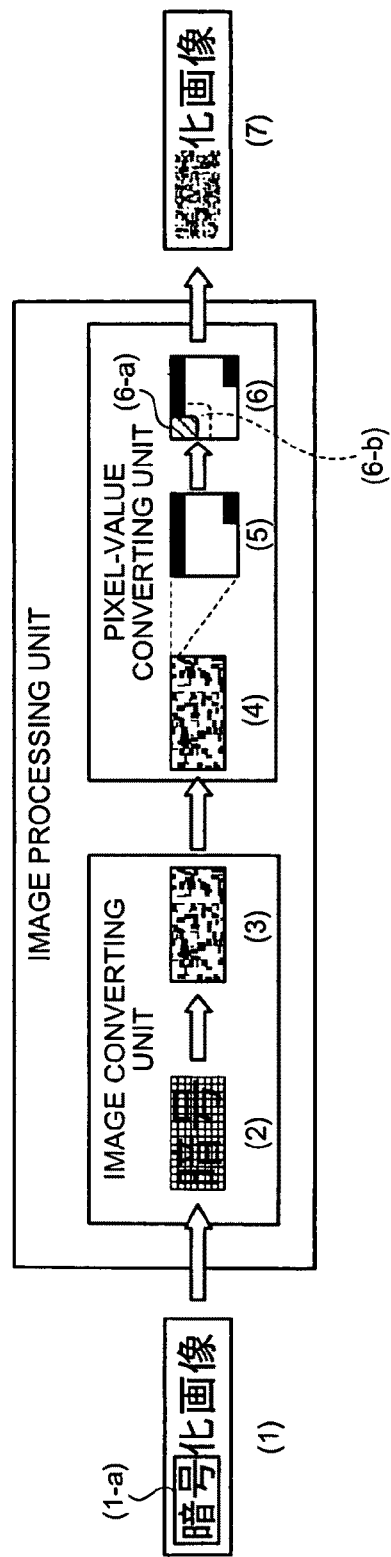

FIG.2

[EQUATION 1]

$y = px \bmod q$

WHERE p AND q ARE PRIMES

[EQUATION 2]

$y = P\max - x + P\min$

[EQUATION 3]

$y = (x + (P\max - P\min + 1)/2 \bmod P\max) + P\min$

[EQUATION 4]

$Y = 0.299R + 0.587G + 0.144B$

WHERE R, G, AND B ARE RESPECTIVE PIXEL VALUES OF RED, GREEN, AND BLUE COMPONENTS

[EQUATION 5]

$(\text{ESTIMATE OF } P) = \sum_{i=0}^{k-1}(\text{PIXEL VALUE OF } n_i/r_i) \Big/ \sum_{i=0}^{k-1}(1/r_i)$ WHERE $n_i$ (i=0, 1, ..., k-1) IS PIXEL NEAR MINIMUM AREA P, AND $r_i$ (i=0, 1, ..., k-1) IS DISTANCE BETWEEN P AND $n_i$

暗号化画像

| ENCRYPTION KEY | BINARY EXPRESSION |
|---|---|
| 1234 (NUMERAL VALUE) | 10011010010 |
| 2006 (NUMERAL VALUE) | 11111010110 |
| ango (CHARACTER STRING) | 01100001011011100110011101101111 |
| code (CHARACTER STRING) | 01100011011011110110010001100101 |

| x | 1 | 2 | 3 | 4 | 5 | 6 | 7 | 8 | 9 | 10 | 11 | 12 |
|---|---|---|---|---|---|---|---|---|---|----|----|----|
| y | 7 | 1 | 8 | 2 | 9 | 3 | 10 | 4 | 11 | 5 | 12 | 6 |

| 1 | 2 | 3 | 4 |
|---|---|---|---|
| 5 | 6 | 7 | 8 |
| 9 | 10 | 11 | 12 |

| 7 | 1 | 8 | 2 |
|---|---|---|---|
| 9 | 3 | 10 | 4 |
| 11 | 5 | 12 | 6 |

GENERATE HISTOGRAM OF EACH COLUMN

FIG.19A
暗号化画像
FIG.19B
FIG.19C
FIG.19D
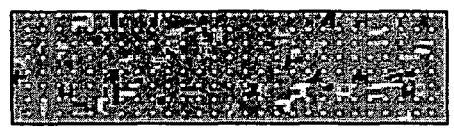
FIG.19E
FIG.19F
FIG.19G
FIG.19H
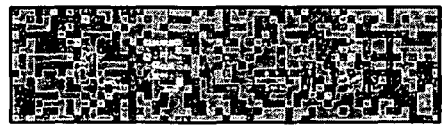
FIG.19I
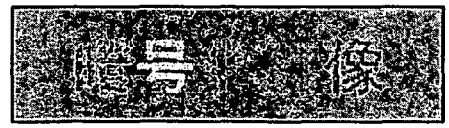

FIG.20

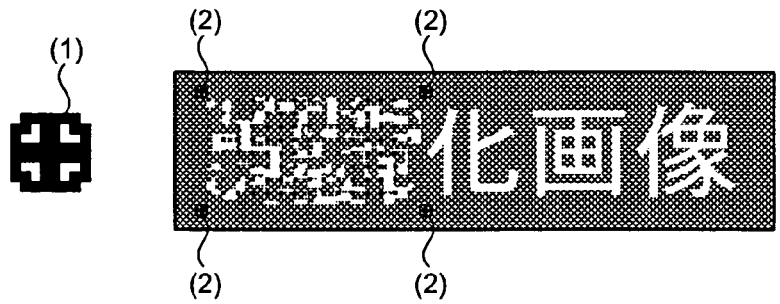

FIG.21

[EQUATION 6]

$Y = 0.299R + 0.587G + 0.144B$ $U = -0.169R - 0.331G + 0.500B$ $V = 0.500R - 0.419G - 0.181B$

WHERE R, G, AND B ARE RESPECTIVE PIXEL VALUES OF RED, GREEN, AND BLUE; Y IS PIXEL VALUE OF BRIGHTNESS COMPONENT, AND U AND V ARE PIXEL VALUES OF COLOR-DIFFERENCE COMPONENTS

[EQUATION 7]

$R = Y + 1.402V$ $G = Y - 0.344U - 0.714V$ $B = Y + 1.772U$

WHERE R, G, AND B ARE RESPECTIVE PIXEL VALUES OF RED, GREEN, AND BLUE COMPONENTS; Y IS PIXEL VALUE OF BRIGHTNESS COMPONENT, AND U AND V ARE PIXEL VALUES OF COLOR-DIFFERENCE COMPONENTS

[EQUATION 8]

$_N P_{N-Nb} = (N)!/(N - Nb)!$

[EQUATION 9]

$\log_2(_N P_{N-Nb})$

IMAGE PROCESSING APPARATUS AND IMAGE PROCESSING METHOD

CROSS-REFERENCE TO RELATED APPLICATIONS

This application is based upon and claims the benefit of priority of the prior Japanese Patent Application No. 2008-074671, filed on Mar. 21, 2008, the entire contents of which are incorporated herein by reference.

BACKGROUND OF THE INVENTION

1. Field

The present invention relates to an image processing apparatus, an image processing method.

2. Description of the Related Art

In the advancing information society, information leakage is a serious problem, and there is a need of developing a technology for preventing the information leakage. For example, there is a developed technology of encrypting digital data so that a third person cannot read the data even if the data is stolen, which has already come into use as an effective way to prevent the information leakage.

On the other hand, there is not yet an effective technology for preventing the information leakage from printed materials, such as a paper medium. Therefore, there is a demand for immediate development of a technology for preventing the information leakage from the printed materials, like the digital data.

Examples of the printed materials that need to be protected from the information leakage include a purchase receipt, a personal ID such as a credit card number and a social security number, a medical record, a report card from school, and a customer list. The present invention can, for example, prevent the information leakage from them by encrypting a significant part of the information.

Conventionally known technologies of encrypting and decrypting printed data include a method of sectioning a document image into a plurality of blocks and rearranging the blocks (see, for example, U.S. Pat. No. 4,459,611), a method of printing an encryption rule in the form of a bar-code on an encrypted document (see, for example, Japanese Patent No. 2963472, pp. 1-4, FIG. 1), a method of black-and-white reversing or mirror reversing each of the rearranged blocks (see, for example, Japanese Patent Application Laid-open No. H8-179689, p. 4, FIG. 3), a method of rotating each of the rearranged blocks (see, for example, Japanese Patent No. 3609097, p. 4, FIG. 3), and a method of adding reference marks to an encrypted image for position detection and detecting borders of the blocks based on the reference marks for performing at least one of recording, scaling, rotating, shifting, and covering of a deficiency, at the time of decryption (see, for example, Japanese Patent Application Laid-open No. H9-504660, p. 13, FIG. 2).

To summarize the method of sectioning an image into a plurality of blocks and rearranging the blocks as described above (hereinafter, "scrambling technique"), when an image processing apparatus performs encryption, the image processing apparatus sections an input image, or an area of the input image to be encrypted, into a plurality of blocks, rearranges or scrambles the blocks based on parameters obtained from an encryption key input to the image processing apparatus, and converts pixel values using such a technique as black-and-white reversing, so that the position of each block can be detected.

To decrypt the image encrypted by the scrambling technique, the image processing apparatus detects the encrypted area and blocks in the encrypted area, and rearranges or reverse-scrambles the blocks based on the parameters obtained from a decryption key input to the image processing apparatus.

However, the above conventional technologies involve a risk that, as described below, the image processing apparatus cannot form a converted image from which a correct decryption can be performed even if the image is degraded, where the converted image means an image that has undergone the scrambling process and the conversion of the pixel values.

For example, with the technologies described in U.S. Pat. No. 4,459,611, Japanese Patent No. 2963472, and Japanese Patent No. 3609097, the position of each block cannot be corrected precisely, and therefore the decryption cannot be performed correctly. More specifically, the conversion of the pixel values is not performed in these technologies, and therefore the position of each block cannot be corrected precisely if the image is distorted by printing or scanning.

Furthermore, with the technologies described in U.S. Pat. No. 4,459,611, Japanese Patent Application Laid-open No. H8-179689, and Japanese Patent Application Laid-open No. H9-504660, by reversing the whole block or by adding the reference marks to the blocks, black pixels increase after the encryption, which cause blurs in printing the image. In this manner, the converted image formed by these technologies cannot correctly reproduce the image.

Moreover, for example, if the encrypted image is in the form of digital data, the information can be completely reproduced when the blocks are black-and-white reversed. However, if the encrypted image is printed and scanned by a scanner, an image of the black-and-white-reversed area cannot be completely reproduced.

Furthermore, for example, because the technologies described in Japanese Patent Application Laid-open No. H8-179689 and Japanese Patent Application Laid-open No. H9-504660 employ black-and-white reversing to convert pixel values, these technologies cannot be applied to an image having multiple tones.

More specifically, with these conventional technologies, the image processing apparatus detects a block by detecting an edge formed on the border between a reversed area and a non-reversed area. This technique postulates that the information to be encrypted is basically black-and-white characters or a black-and-white drawing, and it cannot be applied to an image having the multiple tones, such as a photograph. For example, if the technique is applied to an image with a half tone background as shown in FIG. 23A, the pixel values of the background hardly change as shown in FIG. 23B, and therefore it is hard to detect the border of the blocks.

SUMMARY

It is an object of the present invention to at least partially solve the problems in the conventional technology.

According to an aspect of an embodiment, a computer program product has a computer readable medium including programmed instructions for image processing, wherein the instructions, when executed by a computer, cause the computer to perform: sectioning an image to be processed into a plurality of blocks; rearranging the blocks into positions specified by an encryption key that uniquely specifies the positions of the blocks in the image; determining a computing method used to convert pixel values of pixels that form a minimum area included in each of the blocks after the blocks are rearranged based on the pixel values of predetermined pixels that do not belong to the minimum area; and converting the pixel values based on the computing method determined at the determining.

According to another aspect of an embodiment, a computer program product has a computer readable medium including programmed instructions for image processing, wherein the instructions, when executed by a computer, cause the computer to perform: in a converted image generated by converting pixel values of pixels that form minimum areas in a processed image generated by sectioning an image into a plurality of blocks and rearranging the blocks, wherein a computing method used to convert the pixel values is determined based on predetermined pixels that do not belong to each of the minimum area, detecting a position of a minimum area having a converted pixel value; determining a computing method used to restore the converted pixel value to an original pixel value before the pixel value was converted by the computing method by identifying the computing method for the minimum area; restoring the pixel values of the pixels that form the minimum area; and reverse-rearranging the blocks in original positions thereof in the image before the blocks were rearranged by using an encryption key.

According to still another aspect of an embodiment, an image processing unit includes a sectioning unit that sections an image to be processed into a plurality of blocks; a rearranging unit that rearranges the blocks into positions specified by an encryption key that uniquely specifies the positions of the blocks in the image; and a converting unit that converts pixel values pixels that form a minimum area included in each of the blocks in a processed image generated by rearranging the blocks by the rearranging unit.

According to still another aspect of an embodiment, an image processing method includes sectioning an image to be processed into a plurality of blocks; rearranging the blocks into positions specified by an encryption key that uniquely specifies the positions of the blocks in the image; and converting pixel values pixels that form a minimum area included in each of the blocks in a processed image generated by the rearranging.

According to still another aspect of an embodiment, an image processing system includes a first image processing apparatus and a second image processing apparatus. The first image processing apparatus includes a sectioning unit that sections an image to be processed into a plurality of blocks; a rearranging unit that rearranges the blocks into positions specified by an encryption key that uniquely specifies the positions of the blocks in the image; and a converting unit that converts pixel values pixels that form a minimum area included in each of the blocks in a processed image generated by rearranging the blocks by the rearranging unit. The second image processing apparatus includes a detecting unit that, in the rearranged image, detects a position of a minimum area having a converted pixel value, wherein a computing method used to convert the pixel values is determined based on predetermined pixels that do not belong to each of the minimum area; a determining unit that determines a computing method used to restore the converted pixel value to an original pixel value before the pixel value was converted by the computing method by identifying the computing method for the minimum area; a restoring unit that restores the pixel values of the pixels that form the minimum area; and a reverse-rearranging that reverse-rearranges the blocks in original positions thereof in the image before the blocks were rearranged by using an encryption key.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 1 is a schematic diagram for explaining features of an image processing apparatus according to a first embodiment of the present invention;

FIG. 2 shows equations used to explain the features of the first embodiment;

FIGS. 19A to 19I are schematic diagrams for explaining an effect of using the image processing unit according to the first embodiment;

FIG. 20 is a schematic diagram for explaining a feature of an image processing unit according to a second embodiment of the present invention;

FIG. 21 shows equations used to explain the features of the second embodiment;

DETAILED DESCRIPTION OF THE PREFERRED EMBODIMENTS

Figures 3, 4, 5:
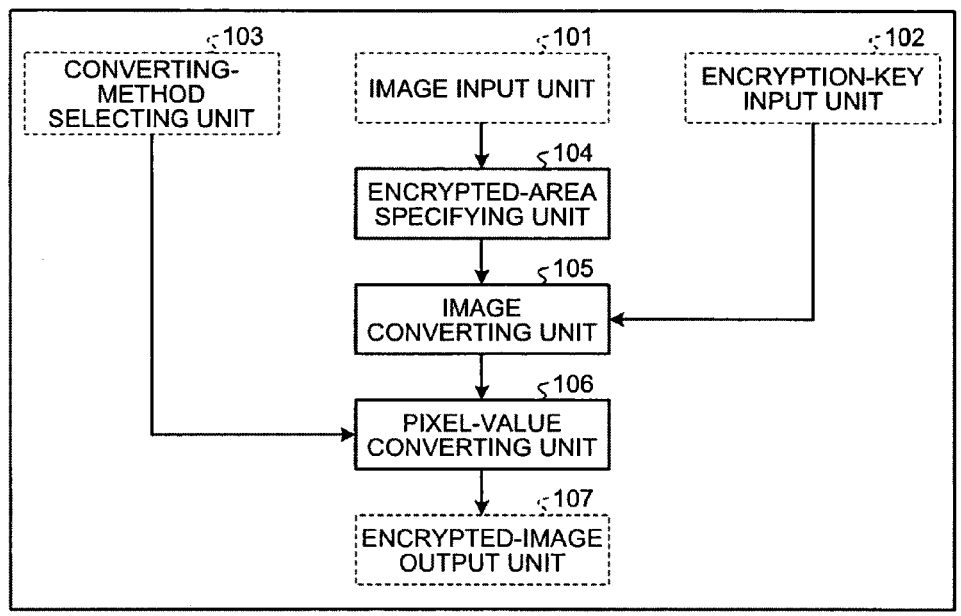
FIG. 3 is a block diagram of an image processing apparatus that performs encryption according to the first embodiment.
FIG. 4 is a schematic diagram of an example of an input image according to the first embodiment.
FIG. 5 is a table showing an example of an encryption key according to the first embodiment.

Exemplary embodiments of the present invention are described in detail below with reference to the accompanying drawings. The present invention is not limited to the embodiments, and various modifications can be made without departing from the scope of the invention.

First, key terms used in the embodiments are explained. "Area to be encrypted" means a specified area of an image to be processed by the image processing apparatus. This includes the whole image and a part of the image specified by a user that uses the image processing apparatus.

"Processed image" means an image that is sectioned into a plurality of blocks, having the blocks rearranged. "Encrypted image" means an image in which the pixel values are converted, for example, the blocks are black-and-white reversed, so that the position of each block in the processed image can be detected.

Features of the image processing apparatus according to a first embodiment of the present invention are explained below with reference to FIG. 1. FIG. 1 is a schematic diagram for explaining the features of the image processing apparatus according to the first embodiment. The image processing apparatus sections an area to be encrypted into a plurality of blocks, rearranges the blocks based on parameters obtained from an encryption key input to the image processing apparatus, and converts pixel values of the image so that the positions of the blocks can be detected, thereby generating an encrypted image. The image processing apparatus is capable of generating an encrypted image, from which a clear image can be retrieved by decryption.

Specifically, an image to be processed is input to the image processing apparatus as indicated by (1) in FIG. 1, and an area to be encrypted is specified as indicated by (1-*a*) in FIG. 1. An image converting unit then sections the image to be processed into a plurality of blocks, as indicated by (2) in FIG. 1.

An image converting unit of the image processing apparatus rearranges the blocks in the positions specified by an encryption key that uniquely specifies a position to each of the blocks, as indicated by (3) in FIG. 1.

The image processing apparatus then converts the pixel values of the pixels that form the minimum areas of the blocks in the processed image indicated by (4) in FIG. 1, as shown in enlargements indicated by (5) and (6) in FIG. 1. More specifically, a pixel-value converting unit of the image processing apparatus converts the pixel values only in the minimum area of the block indicated by (5), as shown in (6-*a*) in FIG. 1.

More clearly, by limiting an area where the pixel value is converted to the minimum area in the block, the image processing apparatus reduces area to be converted the pixels again for decryption.

Furthermore, when the image processing apparatus converts the pixels as indicated by (5) and (6) in FIG. 1, the image processing apparatus determines a computing method for converting the pixel values of the pixels in the minimum area based on predetermined pixels that do not belong to the minimum area. For example, the image processing apparatus determines the computing method based on statistical characteristics computed from the predetermined pixels that form an area near the minimum area (hereinafter, "proximate area").

Specifically, when the image converting unit converts the pixel values of the minimum area shown in (6-*a*) in FIG. 1, the image processing unit computes an average pixel values of pixels that form an area indicated by (6-*b*), and determines the computing method based on the average pixel value.

In other words, instead of determining the computing method based on the pixel values of the pixels to be converted, the image processing unit determines the computing method based on the pixel values of the pixels that are not to be converted. With the conventional technology, for example, even when a unique computing method is determined based on the pixel values of the pixels to be converted, it can not always be identified after the pixel values are converted. However, the image processing unit according to the first embodiment can uniquely identify the computing method that was used to convert the pixel values.

The image processing unit then outputs the encrypted image indicated by (7) in FIG. 1. In the example shown in FIG. 1, the image processing unit outputs an image having only a part of it encrypted.

In this manner, the image processing unit according to the first embodiment is capable of generating an encrypted image, from which a clear image can be retrieve by decryption.

Specifically, compared with a method of converting the pixel values of all the pixels in the block for decryption, the image processing apparatus converts the pixel values of only the pixels in the minimum area. With the reduced area to be converted, for example, increase of black pixels due to the black-and-white reversing is suppressed, blurs in printing are reduced, and therefore an encrypted image, from which a clear image can be retrieved by decryption, can be generated.

Moreover, for example, when the encrypted image is printed and the printed image is scanned for decryption, an original image cannot be correctly restored. However, with the image processing method according to the first embodiment, the area in which the pixel values need to be converted for the decryption is reduced, thereby generating an encrypted image, from which a clear image can be retrieved by decryption.

Furthermore, when the image is decrypted, the image processing apparatus according to the first embodiment can uniquely identify the computing method used for the conversion, thereby generating an encrypted image, from which a clear image can be retrieved by decryption.

For example, with the conventional technology, to restore the converted pixel values, the computing method used to convert the pixel values can not always be uniquely identified by the converted pixel values that form the minimum area of the encrypted image, and therefore it is hard to generate an encrypted image, from which a clear image can be retrieved by decryption.

On the contrary, the image processing apparatus according to the first embodiment determines the computing method based on the pixel values of the pixels that do not belong to the minimum area. Therefore, the image processing apparatus is capable of uniquely identifying the computing method used for the encryption by the pixel values of the unconverted pixels, and thereby generating an encrypted image, from which a clear image can be retrieved by decryption.

Moreover, when the encrypted image is decrypted, the image processing apparatus according to the first embodiment is capable of uniquely identifying the computing method used for the encryption, and thereby generating an encrypted image, from which a clear image can be retrieved by decryption.

Given below is an explanation of a configuration of an image processing apparatus that performs encryption shown in FIG. 1 and an image processing apparatus that performs decryption, with reference to FIGS. 2 to 16. The explanation of the image processing apparatus that performs encryption is given first, and then the explanation of the image processing apparatus that performs decryption is given later for better understanding. However, these configurations are not limited to be separate; they can be integrated into one apparatus.

Figure 6A:
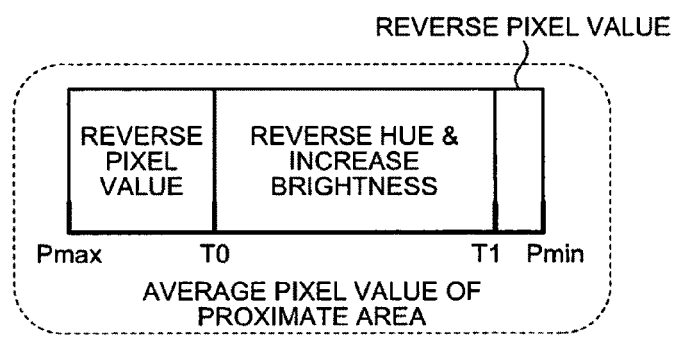
FIGS. 6A and 6B are schematic diagrams for explaining a computing method according to the first embodiment.
Figure 6B:
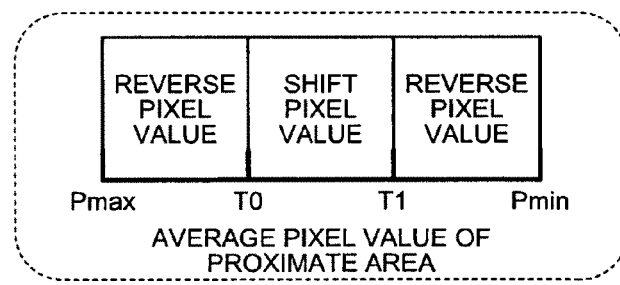
Figure 7:
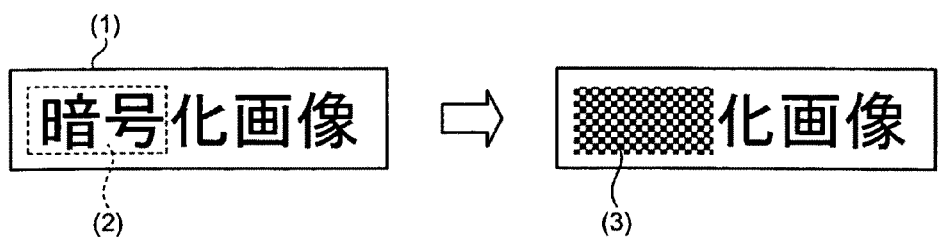
FIG. 7 is a schematic diagram for explaining a process performed by an encrypted-area specifying unit shown in FIG. 3.
Figure 8:
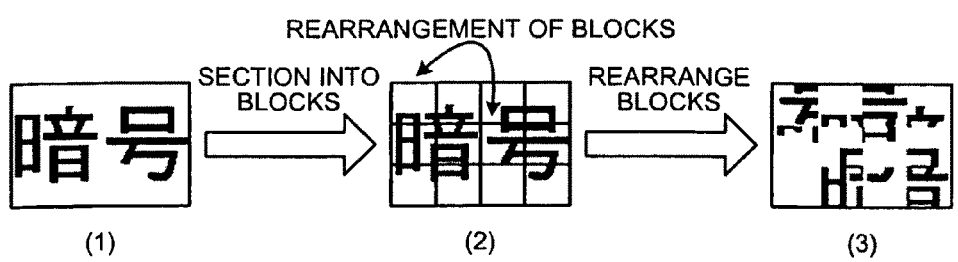
FIG. 8 is a schematic diagram for explaining a process performed by an image converting unit shown in FIG. 3.
Figures 9A, 9B, 9C, 10:
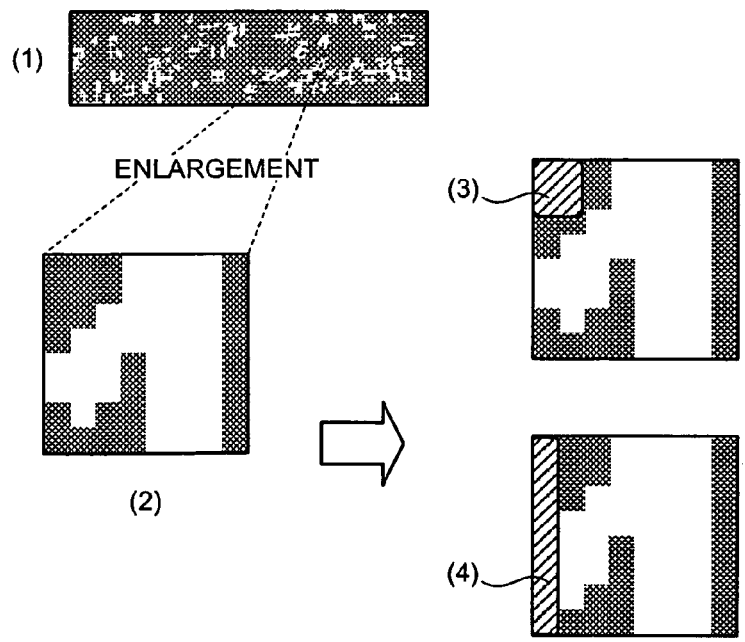
FIGS. 9A, 9B, and 9C are schematic diagrams for further explaining the process performed by the image converting unit.
FIG. 10 is a schematic diagram for explaining a process performed by a pixel-value converting unit shown in FIG. 3.
Figure 11:
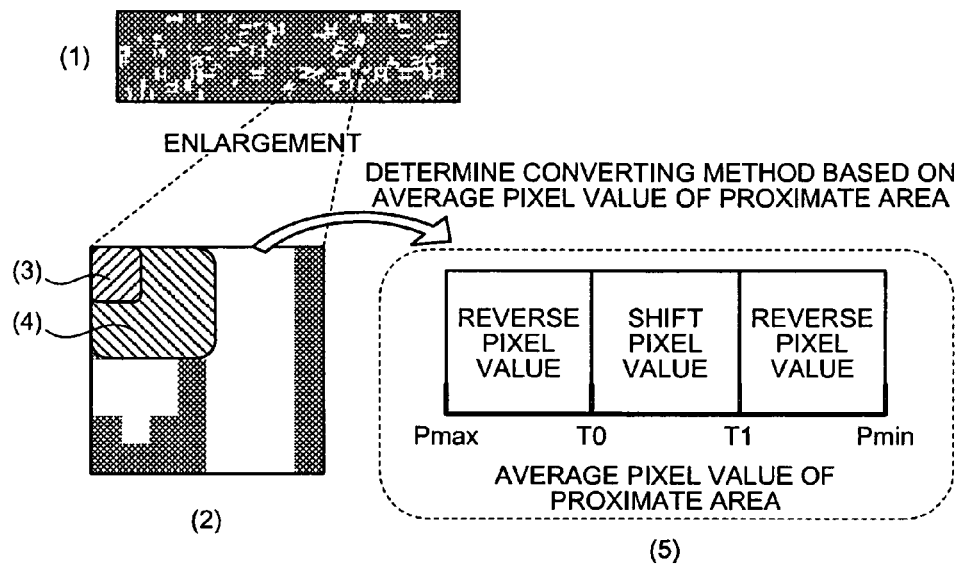
FIG. 11 is a schematic diagram for further explaining the process performed by the pixel-value converting unit.
Figure 12:
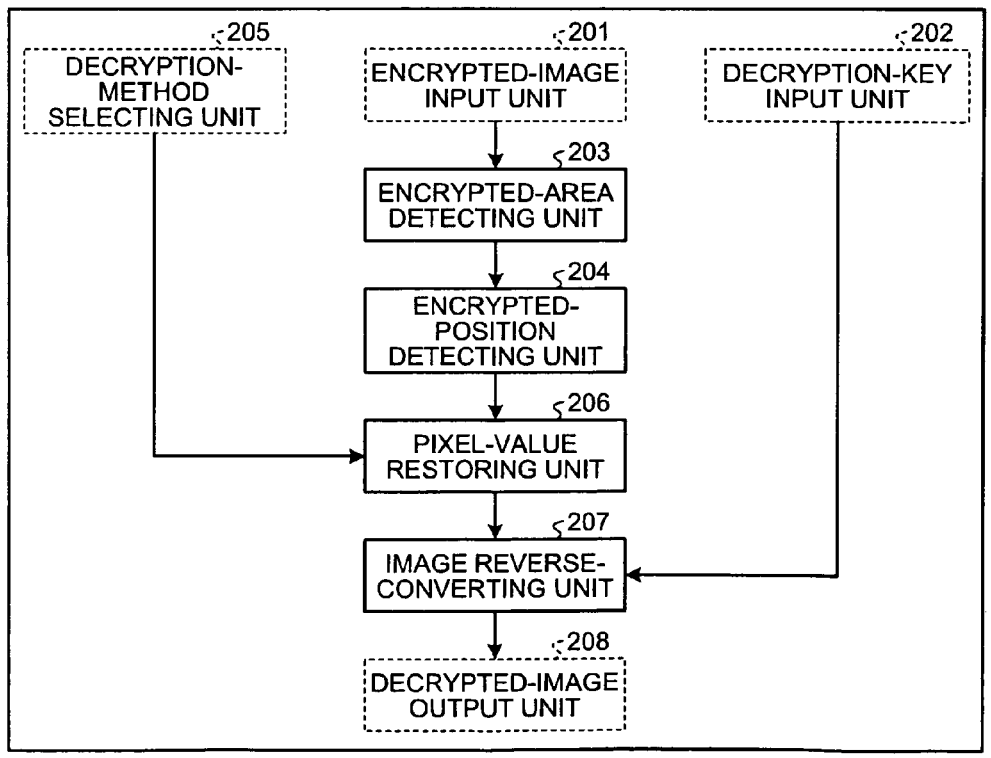
FIG. 12 is a block diagram of an image processing apparatus that performs decryption according to the first embodiment.
Figure 13:
FIG. 13 is a schematic diagram of an example of an encrypted image according to the first embodiment.
Figure 14:
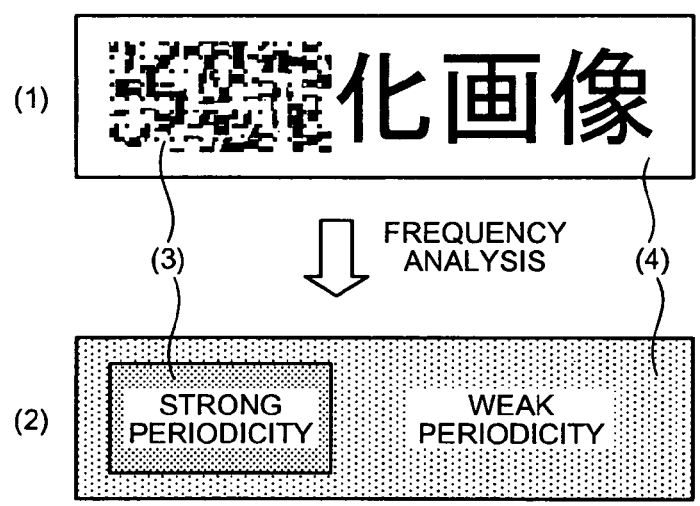
FIG. 14 is a schematic diagram for explaining a process performed by an encrypted-area detecting unit shown in FIG. 12.

FIG. 2 shows equations used to explain the features of the first embodiment. FIG. 3 is a block diagram of the image processing apparatus that performs encryption according to the first embodiment. FIG. 4 is a schematic diagram of an example of an input image according to the first embodiment. FIG. 5 is a table showing an example of the encryption key according to the first embodiment. FIGS. 6A and 6B are schematic diagrams for explaining a computing method according to the first embodiment. FIG. 7 is a schematic diagram for explaining a process performed by an encrypted-area specifying unit 104 shown in FIG. 3. FIG. 8 is a schematic diagram for explaining a process performed by an image converting unit 105 shown in FIG. 3. FIGS. 9A, 9B, and 9C are schematic diagrams for further explaining the process performed by the image converting unit 105. FIG. 10 is a schematic diagram for explaining a process performed by a pixel-value converting unit 106 shown in FIG. 3. FIG. 11 is a schematic diagram for further explaining the process performed by the pixel-value converting unit 106. FIG. 12 is a block diagram of an image processing apparatus that performs decryption according to the first embodiment. FIG. 13 is a schematic diagram of an example of an encrypted image according to the first embodiment. FIG. 14 is a schematic diagram for explaining a process performed by an encrypted-area detecting unit 203 shown in FIG. 12. FIGS. 15A to 15D are schematic diagrams for further explaining the process performed by the encrypted-area detecting unit 203. FIG. 16 is a schematic diagram for explaining a process performed by a pixel-value restoring unit 206 shown in FIG. 12.

As shown in FIG. 3, the image processing apparatus shown in FIG. 1 includes an image input unit 101, an encryption-key input unit 102, a converting-method selecting unit 103, the encrypted-area specifying unit 104, the image converting unit 105, the pixel-value converting unit 106, and an encrypted-image output unit 107.

The image input unit 101 receives an image that includes an area to be encrypted. For example, the image input unit 101 receives such an image as shown in FIG. 4, which is directly input by a user or sent via a network. Although a method that the image input unit 101 receives the image including the area to be encrypted is explained in the first embodiment, the present invention is not limited to receiving the image from outside. Alternatively, the image processing apparatus can be configured without the image input unit 101 to process an image stored in the image processing apparatus. The image received by the image input unit 101 will be processed by the image converting unit 105 and the pixel-value converting unit 106 to be described later.

The encryption-key input unit 102 receives an encryption key that uniquely specifies the positions of the blocks sectioned by the image converting unit 105 in the image. For example, the encryption-key input unit 102 receives such an encryption key as shown in FIG. 5, which is directly input by a user or sent via a network.

In this case, the encryption key determines two primes p and q in Equation 1 shown in FIG. 2, and the encryption-key input unit 102 receives a numeral value, a character string, or one of them expressed by binary number, as shown in FIG. 5, as the encryption key.

The converting-method selecting unit 103 determines whether to use a computing method of reversibly converting the pixel values or irreversibly converting the pixel values to convert the area to be encrypted. For example, the converting-method selecting unit 103 receives a direction to use the computing method of reversibly converting the pixel values from the user of the image processing apparatus, and transfers the directed computing method to the pixel-value converting unit 106.

The computing method of reversibly converting the pixel values and the computing method of irreversibly converting the pixel values are further explained below. The computing method of reversibly converting the pixel values means a method with which the pixel-value restoring unit 206, to be described later, can completely restore the pixel values that was converted by the pixel-value converting unit 106 to the original pixel values.

On the other hand, the computing method of irreversibly converting the pixel values does not postulate that the pixel-value restoring unit 206 will completely restore the pixel values to the original pixel values. It is, for example, a method of generating an encrypted image, from which a clear image can be retrieved by decryption, by converting the pixels so that the converted pixels are less likely to become darker, as shown in FIG. 6A, assuming that the image will be printed.

More specifically, when the encrypted image is printed, darker pixels, i.e., nearly black pixels, often cause blurs and thin spots due to influences by ink or toner. Therefore, as one of irreversibly methods, the image processing apparatus according to the first embodiment uses the computing method of converting the pixels so that the converted pixels are less likely to become darker and that the converted pixels are brighter, i.e., nearly white, thereby suppressing the blurs and the thin spots in the minimum area in which the pixel values are converted (hereinafter, "border marker").

One approach of the irreversible conversion is to convert the pixel values using an average pixel value of the minimum area as the representative value of the minimum area, and to replace the pixel values in the whole minimum area with the representative value. In this case, all the pixels in the minimum area have the same pixel value, which makes the border marker clear, thereby improving accuracy of detecting the border marker even if the blur or the thin spot occurs to the encrypted image by printing it.

In FIGS. 6A and 6B, Pmax means that the pixel value is nearly black, and Pmin means that the pixel value is nearly white. With the computing method of reversible conversion shown in FIG. 6B, if the pixel value is Pmax to T0, the pixel value is reversed from black to white, if the pixel value is T0 to T1, the pixel value is shifted, e.g., the pixel value is reduced by X, and if the pixel value is T1 to Pmin, the pixel value is reversed from white to black.

On the other hand, with the computing method of irreversible conversion shown in FIG. 6A, compared with the method shown in FIG. 6B, a range between T1 and Pmin, where black pixel is converted to white pixel, is narrower. Furthermore, with the computing method of irreversible conversion shown in FIG. 6A, unlike the method shown in FIG. 6B, if the pixel value is T0 to T1, "the hue is reversed and the brightness is increased" instead of shifting the pixel value.

When the computing method of irreversible conversion is selected, though it is impossible to completely restore the pixel values of the original image, the pixel-value restoring unit 206 performs image compensation, thereby compensating the images formed with the pixels of which the pixel values cannot be completely restored to the original values.

Although the method with which the converting-method selecting unit 103 transfers the computing method specified by the user to the pixel-value converting unit 106 is explained in the first embodiment, the present invention is not limited to this method. Alternatively the converting-method selecting unit 103 can automatically select which one of the reversible computing method or the irreversible computing method to use without receiving the direction from the user. For example, if the encrypted image is likely to be printed, the converting-method selecting unit 103 selects the irreversible computing method, and if the encrypted image is not printed, the converting-method selecting unit 103 selects the reversible computing method.

The encrypted-area specifying unit 104 specifies an area to be encrypted in the image input from the image input unit 101. For example, in the image input from the image input unit 101 as indicated by (1) in FIG. 7, the encrypted-area specifying unit 104 specifies the area to be encrypted as indicated by (2) in FIG. 7. The area specified by the encrypted-area specifying unit 104 is then converted by the image converting unit 105 and the pixel-value converting unit 106 as indicated by (3) in FIG. 7.

To specify the area to be encrypted, for example, the encrypted-area specifying unit 104 can receive a specification of the area from the user via an input unit (not shown) such as a mouse, or the encrypted-area specifying unit 104 can specify the area using a template of the area to be encrypted, which is stored in the encrypted-area specifying unit 104 in advance. After the area specified by the encrypted-area specifying unit 104 is processed by the image converting unit 105 and the pixel-value converting unit 106 and the encrypted image is output, if it is required to encrypt another area in the encrypted image that is once output, the encrypted-area specifying unit 104 can specify the area to be encrypted again and the same process is performed.

The image converting unit 105 sections the area to be encrypted into a plurality of blocks. For example, the image converting unit 105 sections an area to be encrypted as indicated by (1) in FIG. 8 into a plurality of blocks as indicated by (2) in FIG. 8. More specifically, for example, the image converting unit 105 sections the area into four columns by three rows, which makes 12 blocks. The explanation is given assuming that the blocks are assigned with numbers one to twelve as shown in FIGS. 9A to 9C, for convenience.

The image converting unit 105 rearranges the blocks into positions specified by the encryption key. Specifically, the image converting unit 105 visually converts the image in the area to be encrypted, as indicated by (3) in FIG. 8. For example, the image converting unit 105 generates a conversion table of the block using the encryption key received by the encryption-key input unit 102.

More specifically, assuming that the number assigned to each block before conversion is x, by assigning p and q, which are primes determined by the encryption key, to Equation 1 shown in FIG. 2, the image converting unit 105 computes each number y corresponding to x, which indicates the position of the block after the conversion.

That is, when p is 7 and q is 13 as shown in FIG. 9A, the image converting unit 105 performs computation so that y is 7 when x is 1. In other words, for example, because y is 7 when x is 1, the image converting unit 105 moves the block that was originally located at 7 to the position of the block 1. By performing the same process to all the blocks, the image converting unit 105 generates the processed image as shown in FIG. 9C.

The pixel-value converting unit 106 converts the pixel values of the pixels that form all of the minimum areas included in the block in the processed image, in which the blocks are rearranged by the image converting unit 105. Specifically, the pixel-value converting unit 106 converts the pixel values of the minimum areas in the blocks so that the positions of the minimum areas can be precisely detected. In short, the pixel-value converting unit 106 generates the encrypted image from the processed image.

The pixel-value converting unit 106 determines the computing method used to convert the pixel values of the pixels that form the minimum area based on the predetermined pixels in the proximate area, and converts the pixel values accordingly. For example, the pixel-value converting unit 106 determines the computing method based on the statistical characteristics computed from the predetermined pixels that form the proximate area.

In other words, unlike the method of converting the pixel values of all the pixels in the block, or a known pixel-value converting method of regularly converting the pixel values of a part of the block, the pixel-value converting unit 106 converts the pixel values using the computing method corresponding to an arbitrary area except the minimum area in the block.

More specifically, the pixel-value converting unit 106 can set any size and any shape of area as the minimum area as long as it is smaller than the block, as indicated by (3) and (4) in FIG. 10, which is a part of the block indicated by (2) in FIG. 10 in the area to be encrypted indicated by (1) in FIG. 10.

For example, the pixel-value converting unit 106 can generate the border marker at the corner of the block as indicated by (3) in FIG. 10, or at the edge of the block as indicated by (4) in FIG. 10. It is desirable that the position and the shape of the border marker are registered in advance as parameters.

In this manner, the pixel-value converting unit 106 generates the border marker by converting the pixel values in the minimum area in the block, thereby suppressing degradation of the image quality and making it easier to perform the image compensation to be described later.

Further explanation is given by citing an example that the pixel-value converting unit 106 converts the pixel values using the computing method of reversibly converting the pixel values. To convert the pixel value in the minimum area indicated by (3) in FIG. 11 in the area to be encrypted as indicated by (1) in FIG. 11, the pixel-value converting unit 106 computes the average pixel value of the proximate area near the minimum area in which the pixel values are to be converted, as indicated by (4) in FIG. 11.

The statistical characteristics herein includes an average value, a variance value, a median value, and an average value weighted by the distance from the minimum area, as indicated by Equation 5 in FIG. 2.

The pixel-value converting unit 106 determines the method of converting the pixel values based on the computed average pixel value. Specifically, as shown in (5) in FIG. 11, if the pixel value is Pmax to T0, the pixel value is reversed from black to white, if the pixel value is T0 to T1, the pixel value is shifted, e.g., reduced by X, and if the pixel value is T1 to Pmin, the pixel value is reversed from white to black.

For example, to perform the pixel value reverse to convert the pixel values, the pixel-value converting unit 106 determines the pixel value of the converted pixel using Equation (2) shown in FIG. 2. In Equation (2), x is the pixel value before conversion, and y is the pixel value after conversion. To perform the pixel value shift to convert the pixel values, the pixel-value converting unit 106 determines the pixel value of the converted pixel using Equation (3) shown in FIG. 2.

It is assumed that Pmax is 255, Pmin is 0, T0 is 64, and T1 is 192. When the pixel value of the minimum area in the block is 80 and the pixel value of the proximate area is 120, the pixel-value converting unit 106 determines to perform the pixel value shift. Based on the computation using Equation (3) shown in FIG. 2, which is (80+128)mod 256=208, the pixel-value converting unit 106 converts the pixel value to 208.

The pixel-value converting unit 106 performs the same process even if the pixel includes a plurality of components. For example, if a pixel includes a black component and a white component in a black and white image, or if a pixel includes a red component, a green component, and a blue component in a color image, the pixel-value converting unit 106 converts the pixel values of part or all of the color components that form the minimum area.

Specifically, in Equation (4) shown in FIG. 2, the pixel values of part or all of the red component (R in Equation (4)), the green component (G in Equation (4)), and the blue component (B in Equation (4)) can be converted.

Significance of the process performed by the pixel-value converting unit 106 is further explained below. Because the pixel-value converting unit 106 determines the method of converting the minimum area based on the pixels that do not belong to the minimum area, if the computing method selected by the converting-method selecting unit 103 is already known, the pixel-value restoring unit 206 can determine the converting method for restoring by computing the average pixel value of the proximate area.

For example, with the conventional method, in this case, the pixel value 80 is converted to 208 by the pixel value shift. The pixel value 208 is equal to a value reversed from the pixel value 47, which is obtained by 255−47=208, and therefore it is hard to completely restore the pixel value of the original image.

On the contrary, in the encrypted image with its pixel values converted by the pixel value conversion, the pixel value of the proximate area has not changed and is still 120 when the pixel-value restoring unit 206 performs decryption, and therefore it is clear that the method used to convert the pixel values in the minimum area is the pixel value shift. In this manner, the pixel-value restoring unit 206 selects the pixel value shift as the method of restoring the pixel values, and the value is obtained using Equation (3) shown in FIG. 2, which is (208+128)mod 256=80, thereby completely restoring the pixel values.

Alternatively, the pixel-value converting unit 106 can use the computing method of irreversibly converting the pixel value.

The encrypted-image output unit 107 outputs the encrypted image generated by the pixel-value converting unit 106. For example, the encrypted-image output unit 107 prints the encrypted image using a printer or the like (not shown), outputs it as electronic data, or stores it in a recording medium (not shown).

A configuration of the image processing apparatus that decrypts the encrypted image is explained below. As shown in FIG. 12, the image processing apparatus that decrypts the encrypted image includes an encrypted-image input unit 201, a decryption-key input unit 202, the encrypted-area detecting unit 203, an encrypted-position detecting unit 204, a decryption-method selecting unit 205, the pixel-value restoring unit 206, an image reverse-converting unit 207, and a decrypted-image output unit 208.

The encrypted-image input unit 201 receives the encrypted image in which the pixel values are converted by the pixel-value converting unit 106. For example, the encrypted-image input unit 201 receives an encrypted image as shown in FIG. 13, which is directly input by the user or sent via the network. The image received by the encrypted-image input unit 201 will be processed by the pixel-value restoring unit 206 and the image reverse-converting unit 207 to be described later.

The decryption-key input unit 202 receives a decryption key that uniquely specifies the original positions of the rearranged blocks before they were rearranged in the image. The decryption key received by the decryption-key input unit 202 will be used by the image reverse-converting unit 207. The image processing apparatus according to the first embodiment uses the decryption key that is identical to the encryption key.

The encrypted-area detecting unit 203 detects the encrypted area in the encrypted image received by the encrypted-image input unit 201. For example, the encrypted-area detecting unit 203 uses an image processing technique to detect the encrypted area. As shown in FIG. 14, the minimum area in the encrypted area of the encrypted image includes the border marker. Because of the border marker, when a frequency analysis is performed on the encrypted image, the encrypted area tends to show strong periodicity as indicated by (3) in FIG. 14, and other areas tend to show weak periodicity as indicated by (4) in FIG. 14. The encrypted-area detecting unit 203 detects the encrypted area based on the difference of the periodicity.

Alternatively, the encrypted-area detecting unit 203 can receive a specification of the encrypted area from an input device such as a mouse, or it can specify the encrypted area based on information about the encrypted area stored therein as a template in advance.

The encrypted-position detecting unit 204 detects the position of each minimum area, of which the pixel value is converted, in the encrypted image. For example, the encrypted-position detecting unit 204 detects the positions of a plurality of blocks so that the pixel-value restoring unit 206 can perform the process correctly. Specifically, the encrypted-position detecting unit 204 detects the border marker in each block, thereby detecting the position of the block.

Figure 15A:
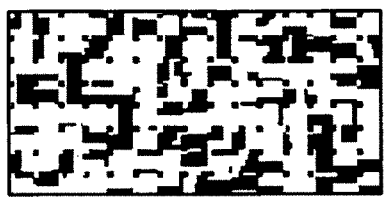
FIGS. 15A to 15D are schematic diagrams for explaining the process performed by the encrypted-position detecting unit.
Figure 15B:

For example, as shown in FIGS. 15A to 15D, the encrypted-position detecting unit 204 uses a median filter, which outputs the median value of a predetermined pixel and pixels near the predetermined pixel, to detect the position of the block. An image shown in FIG. 15A is the encrypted area detected by the encrypted-area detecting unit 203, and an image shown in FIG. 15B is the encrypted area filtered by a 3×3 median filter, which outputs the median value of the predetermine pixel and eight surrounding pixels.

In the image shown in FIG. 15B, the border marker area has been removed by the median filter. By detecting the difference between the images shown in FIGS. 15A and 15B, the encrypted-position detecting unit 204 detects the border marker as shown in FIG. 15C.

Figure 15C:
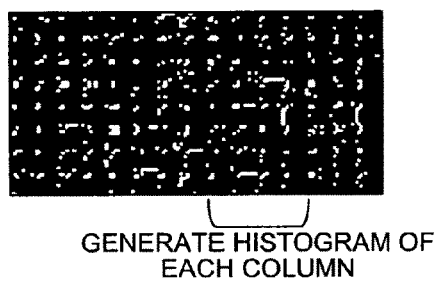
Figure 15D:
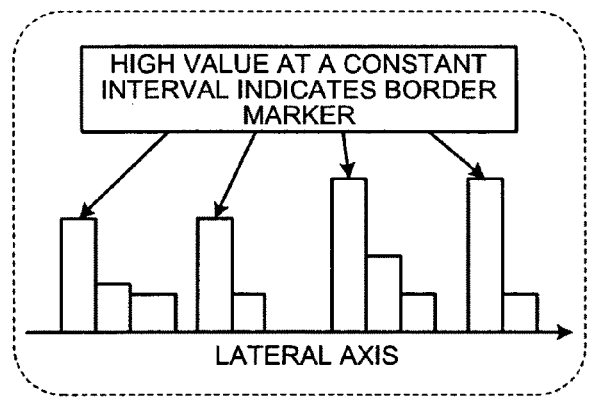
Figure 16:
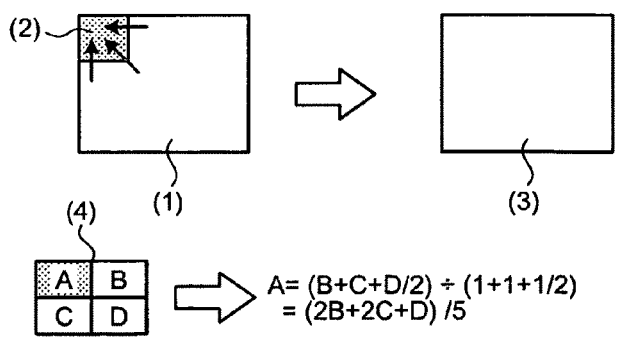
FIG. 16 is a schematic diagram for explaining a process performed by a pixel-value restoring unit shown in FIG. 12.

More specifically, the encrypted-position detecting unit 204 generates a histogram with respect to each column in the image shown in FIG. 15C, and determines that the border marker is located where the value is high, which appears at a constant interval, as shown in FIG. 15D. The histogram is generated and the border marker is detected in the same manner with respect to each row. The encrypted-position detecting unit 204 detects the position of each block by detecting the border marker in the block.

The decryption-method selecting unit 205 selects the computing method determined by predetermined pixels that do not belong to the minimum area detected by the encrypted-position detecting unit 204, with respect to each minimum area. Specifically, the decryption-method selecting unit 205 determines whether the encrypted image is a printed image, thereby selecting one of the pixel value reverse and the image compensation.

For example, the decryption-method selecting unit 205 determines whether the encrypted image received by the encrypted-image input unit 201 is an image obtained by scanning a printed encrypted image. An image once printed and scanned has a distortion or a blur in the image, and the pixel values are changed. Therefore, the decryption-method selecting unit 205 determines whether the size of all the detected blocks are equal to the size of the blocks before encryption, and whether the pixel value of the border marker is apparently different from the pixel value of the pixels near the border marker. If at least one determination is no, the decryption-method selecting unit 205 determines that the encrypted image is a scanned image.

If the encrypted image is a scanned image, because the pixel value of the border marker generated by the encryption cannot be completely restored due to the blur of ink or toner, the decryption-method selecting unit 205 determines to perform the image compensation. If the encrypted image is not a scanned image, the decryption-method selecting unit 205 determines whether the pixel values were converted by the computing method of reversible conversion. If the pixel values were converted by the computing method of reversible conversion, the decryption-method selecting unit 205 determines to perform the reverse conversion. Otherwise, the decryption-method selecting unit 205 determines to perform the image compensation like the case of the scanned image, because the pixel value of the border marker cannot be completely restored.

The pixel-value restoring unit 206 restores the converted pixel value to the pixel value before conversion by using the computing method selected by the decryption-method selecting unit 205. Specifically, the pixel-value restoring unit 206 performs the image value reverse or the image compensation.

For example, if the decryption-method selecting unit 205 determines to perform the image compensation, the pixel-value restoring unit 206 performs the image compensation on each pixel of which the pixel value was converted, thereby restoring the pixel value. As the method of performing the image compensation, the pixel-value restoring unit 206 can use a typical technique. For example, to perform the image compensation on the border marker indicated by (2) included in the block indicated by (1) in FIG. 16, the pixel-value restoring unit 206 performs the image compensation using the average pixel value of the pixels near the border marker as the pixel value of the border marker indicated by (2) in FIG. 16, so that the border marker is restored as indicated by (3) in FIG. 16.

Alternatively, the pixel-value restoring unit 206 can perform the image compensation using the average value weighted by the distance from the minimum area, as indicated by Equation 5 in FIG. 2. For example, assuming that the pixel in the minimum area to be compensated is P, that k pixels near P is $n_i$, where i is an integer from zero to k−1, and that the distance between P and $n_i$ is $r_i$, an estimated value of P is expressed by Equation 5 in FIG. 2.

More specifically, as shown in (4) in FIG. 16, if the pixel values of the border marker and the pixels near the border marker are represented by pixels A, B, C, and D, assuming that the distance between A and B and the distance between A and C is one and that the distance between A and D is two, the pixel-value restoring unit 206 can use A=(2B+2C+D)/5 as the compensated pixel value.

Furthermore, the pixel-value restoring unit 206 restores the pixel value of the minimum area detected by the encrypted-position detecting unit 204 by reversing the pixel values of each pixel in the minimum area based on the computing method determined by the statistical characteristics of the pixels near the minimum area.

For example, if the input image is not the scanned image, i.e., if it is a digital image, the pixel-value restoring unit 206 performs a reverse process of the computing method performed by the pixel-value converting unit 106, thereby reversing the pixel value of the minimum area. In this manner, the pixel value can be completely restored with matching bits.

The image reverse-converting unit 207 rearranges each block identified by each minimum area detected by the encrypted-position detecting unit 204 in an original position of the block in the image before the blocks were rearranged using the encryption key. In other words, the image reverse-converting unit 207 performs the reverse process of a scrambling process performed by the image converting unit 105, which is referred to as a reverse scrambling process.

For example, citing the example shown in FIG. 9, when x is 1, y is 7. Therefore, the image reverse-converting unit 207 determines that the pixel in the position of 1 in the encrypted image was originally located at the position of 7, and rearranges the block accordingly. The image reverse-converting unit 207 performs the same process on all of the blocks.

Because the method of rearranging the blocks is uniquely determined by the decryption key, the image reverse-converting unit 207 correctly rearranges the encrypted image so that the information protected by the encryption, only if the decryption key received by the decryption-key input unit 202 is correct.

The decrypted-image output unit 208 outputs the image processed by the pixel-value restoring unit 206 and the image reverse-converting unit 207.

The image processing apparatus can be, for example, a personal computer, a workstation, a home video game machine, an internet TV, a personal digital assistant, or a mobile communication equipment such as a mobile phone and a personal handyphone system.

Figure 17:
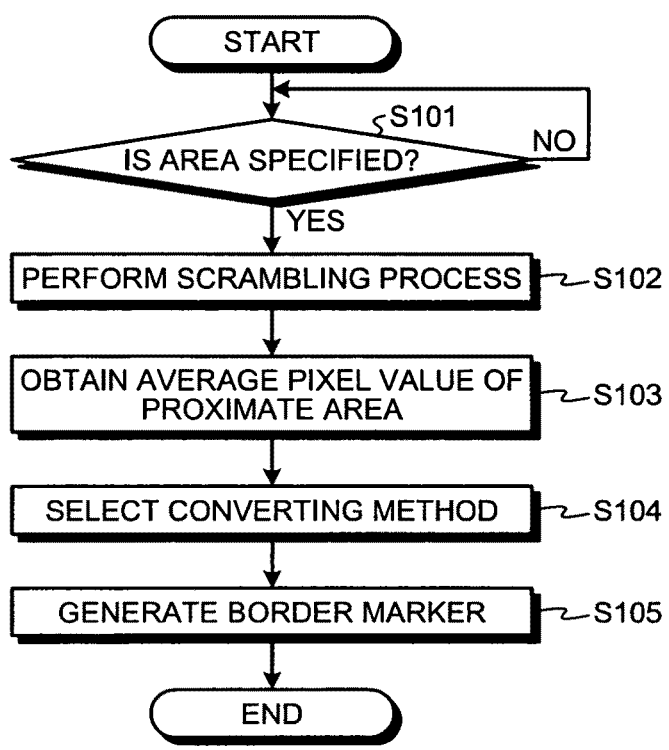
FIG. 17 is a flowchart of an encrypting process according to the first embodiment.

Processes performed by the image processing apparatus are explained with reference to FIGS. 17 and 18. The explanation of the encrypting process is given first with reference to FIG. 17, and then the explanation of the decrypting process is given with reference to FIG. 18. FIG. 17 is a flowchart of the encrypting process according to the first embodiment, and FIG. 18 is a flowchart of the decrypting process according to the first embodiment.

As shown in FIG. 17, the encrypted-area specifying unit 104 when the encrypted-area specifying unit 104 specifies the area to be encrypted (YES at Step S101), the image converting unit 105 performs the scrambling process (Step S102). In other words, the image converting unit 105 sections the area to be encrypted into a plurality of blocks, and rearrange the blocks.

The pixel-value converting unit 106 obtains the average pixel value of the proximate area (Step S103), and selects the converting method (Step S104). In other words, the pixel-value converting unit 106 determines the computing method based on the statistical characteristics computed from the predetermined pixels that form the area near the minimum area. The pixel-value converting unit 106 then generates the border marker (Step S105). In other words, the pixel-value converting unit 106 converts the pixel values of the pixels that form the minimum area.

Figure 18:
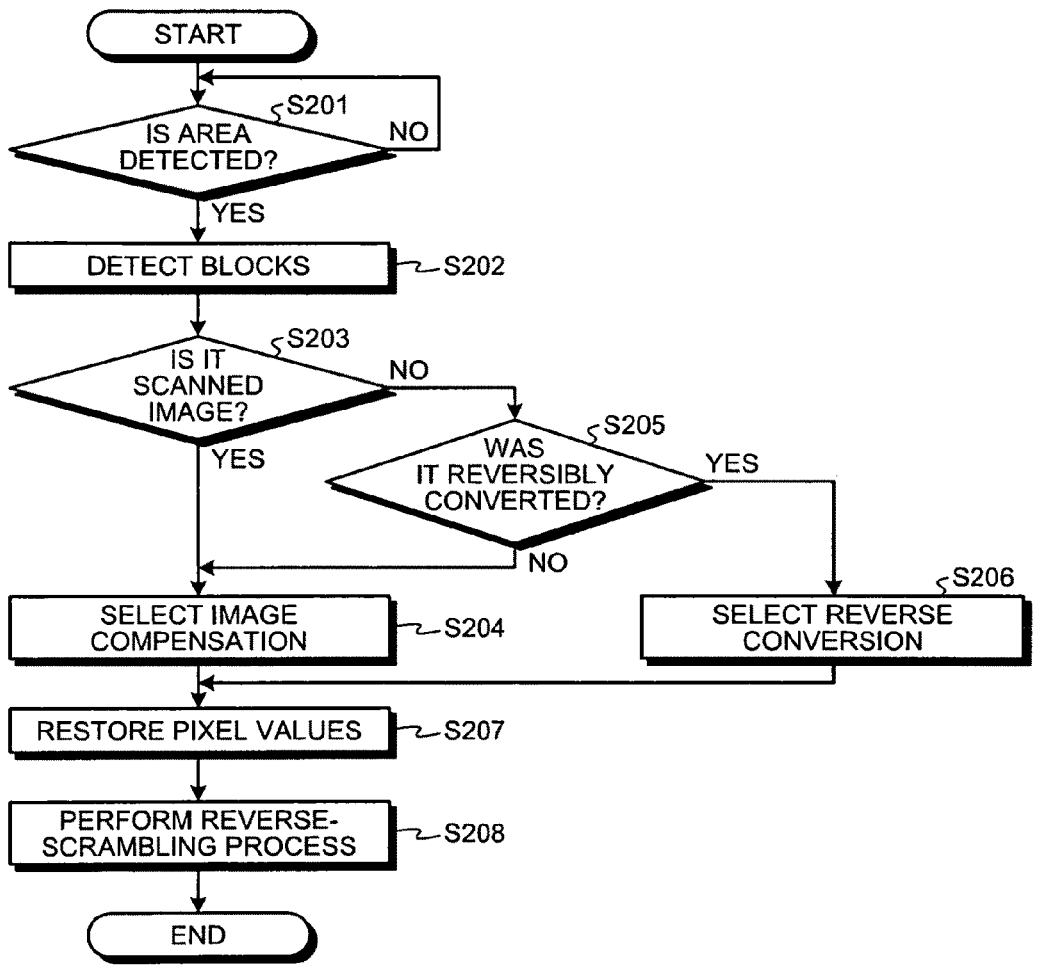
FIG. 18 is a flowchart of a decrypting process according to the first embodiment.

As shown in FIG. 18, when the encrypted-area detecting unit 203 detects the encrypted area (YES at Step S201), the encrypted-position detecting unit 204 detects blocks (Step S202). In other words, the encrypted-position detecting unit 204 detects the position of each block in which the pixel values are converted.

The decryption-method selecting unit 205 determines whether the encrypted image is a scanned image (Step S203).

If it is a scanned image (YES at Step S203), the decryption-method selecting unit 205 selects the image compensation (Step S204). On the contrary, if it is not a scanned image (No at Step S203), the decryption-method selecting unit 205 determines whether the pixel values in the encrypted image were reversibly converted (Step S205). If the pixel values were reversibly converted (YES at Step S205), the decryption-method selecting unit 205 selects the reverse conversion (Step S206). If the pixel values were irreversibly converted (NO at Step S205), the decryption-method selecting unit 205 selects the image compensation (Step S204).

The pixel-value restoring unit 206 restores the converted pixel values to the original pixel values before conversion based on the computing method selected by the decryption-method selecting unit 205 (Step S207).

The image reverse-converting unit 207 performs the reverse-scrambling process (Step S208). In other words, the image reverse-converting unit 207 rearranges each block in its original position in the image before the blocks were rearranged.

As described above, according to the first embodiment, the image processing apparatus determines the computing method used to convert the pixel values of the pixels that form the minimum area in the block in the processed image based on predetermined pixels that do not belong to the minimum area. Therefore, the image processing apparatus is capable of generating an encrypted image, from which a clear image can be retrieve by decryption.

Specifically, compared with the method of converting the pixel values of all the pixels in the block for decryption, the image processing apparatus converts the pixel values of only the pixels in the minimum area. With the reduced area to be converted, for example, increase of black pixels due to the black-and-white reversing is suppressed, blur in printing is reduced, and therefore an encrypted image, from which a clear image can be retrieved by decryption, can be generated.

For example, when the encrypted image is printed and the printed image is scanned for decryption, an original image cannot be precisely restored. However, with the image processing method according to the first embodiment, the area in which the pixel values need to be converted for the decryption is reduced, thereby generating an encrypted image, from which a clear image can be retrieved by decryption.

Furthermore, when the image is decrypted, the image processing apparatus according to the first embodiment can uniquely identify the computing method used for the conversion, thereby generating an encrypted image, from which a clear image can be retrieved by decryption.

For example, with the conventional technology, to restore the converted pixel values, the computing method used to convert the pixel values can not always be uniquely identified by the converted pixel values that form the minimum area of the encrypted image, and therefore it was hard to generate an encrypted image, from which a clear image can be retrieved by decryption.

Specifically, with the conventional method, as long as an encrypted image shown in FIG. 19B generated from an original image shown in FIG. 19A is in the form of digital data, the apparatus can completely restore the original image. However, if the encrypted image is once printed and scanned, the pixel values that form the encrypted image are different from the pixel values in the digital data, i.e., the original data, and therefore it is hard to completely restore the original image, as shown in FIG. 19C.

On the contrary, the image processing apparatus according to the first embodiment converts only the pixel values in the minimum area, and determines the computing method based on the pixels that do not belong to the minimum area. Therefore, the image processing apparatus can reduce the blur due to printing, and uniquely identify the computing method used for conversion, thereby generating an encrypted image, from which a clear image can be retrieved by decryption, as shown in FIG. 19D.

Figure 23A:
FIGS. 23A and 23B are schematic diagrams for explaining a conventional technology.
Figure 23B:
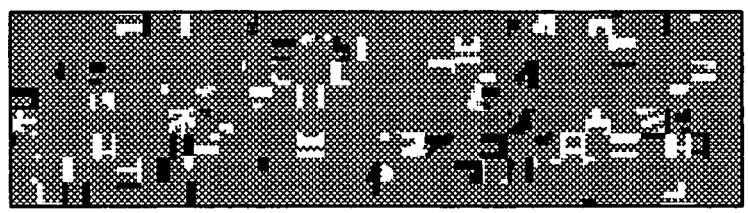

The image processing apparatus can process a grayscale image and a color image, in addition to a black-and-white image. For example, an image shown in FIG. 19E is an encrypted image generated from a black-and-white image, and an image shown in FIG. 19F is an encrypted image generated from a color image. Although the pixel values of halftone pixels are hardly changed by reversing with the conventional method (see FIGS. 23A and 23B), the image processing apparatus can change the pixel values of the border marker.

An explanation is given below with reference to an example using a color image. When an encrypted image of the color image shown in FIG. 19G is printed and scanned, compared with an image decrypted by the conventional method as shown in FIG. 19H, quality of an image decrypted by the image processing method according to the first embodiment as shown in FIG. 19I is improved.

That is, with the image processing apparatus, the method of converting the pixel values is not constant but it is determined with respect to each minimum area, and therefore the image can be encrypted and decrypted no matter it is black-and-white or color. Furthermore, because only the pixel values in the minimum area are converted, a clear image can be retrieved from the encrypted image even if blurs and thin spots are generated in printing.

Moreover, because the image processing apparatus determines the computing method to convert the pixel values based on the statistic characteristics computed from the predetermined pixels that form the area near the minimum are, the image processing apparatus can uniquely identify the computing method used for the conversion, thereby generating an encrypted image, from which a clear image can be retrieved by decryption.

Furthermore, because the image processing apparatus converts the pixel value using the computing method of reversibly conversing the pixel value, if the encrypted image is treated without being converted into analog data, i.e., without being printed, the image processing apparatus can completely convert the pixels to the original pixel value in the reverse way.

Furthermore, because the image processing apparatus converts the pixel value using the computing method of irreversibly converting the pixel value, the image processing apparatus is capable of generating an encrypted image, from which a clear image can be retrieved by decryption.

For example, when the encrypted image is printed, darker pixels, which are nearly black, often cause blurs and thin spots due to influences by ink or toner. Therefore, as one of irreversibly methods, the image processing apparatus according to the present invention uses the computing method of converting the pixels so that the converted pixels are less likely to become darker and that the converted pixels are near white, thereby suppressing the blurs and the thin spots to increase accuracy of detecting the border marker. As a result, the image processing apparatus is capable of generating an encrypted image, from which a clear image can be retrieved by decryption.

In other words, by switching the method of converting the pixel values between the reversible conversion and the irreversible conversion, the image processing apparatus can generate an encrypted image suitable to various applications, such as a case that needs to match bits or that a high detection accuracy is required.

A pixel includes color components indicative of one or more colors; a black-and-white component in a black-and-white image, and the red component, the green component, and the blue component in a color image. Each color component includes a pixel value. Because the image processing apparatus converts part or all of the color components included in each pixel that form the minimum area, for example, by converting the pixel value of only the color component that makes more visual impact instead of all the color components, the image processing apparatus can reduce burden on the pixel-value converting process, thereby increasing throughput rate of the process.

Moreover, the image processing apparatus detects the position of each minimum area in which the pixel value has been converted, identifies the computing method determined by the predetermined pixels that do not belong to the detected minimum area, determines a computing method to restore the pixel value converted by the identified computing method to the original pixel value, restores the pixel values in the minimum area, and rearranges each block identified by the detected minimum area to its original position in the image before encryption using the encryption key. Therefore, the image processing apparatus can retrieve a clear image from the encrypted image.

Furthermore, because the image processing apparatus compensates for the pixel value of each pixel in the minimum area using the pixel value computed based on the statistic characteristics of the pixels near the minimum area, the image processing apparatus can retrieve a clear image from the encrypted image by restoring the converted pixel value by the compensation.

The present invention can be embodied in various ways except for the first embodiment. A second embodiment of the present invention is explained below with reference to FIGS. 20 and 21. FIG. 20 is a schematic diagram for explaining a feature of an image processing unit according to the second embodiment, and FIG. 21 shows equations used to explain the features of the second embodiment.

Although the method in which the pixel-value converting unit 106 generates the border marker in all the blocks was explained in the first embodiment, the present invention is not limited to the method explained in the first embodiment. Alternatively, the pixel-value converting unit 106 can generate the border marker in part of the blocks. Furthermore, the pixel-value converting unit 106 can also apply a check mark to verify validity of decryption of the encrypted image. Otherwise, the pixel-value converting unit 106 can apply position detecting markers as indicated by (1) in FIG. 20 to four corners of the area to be encrypted as indicated by (2) in FIG. 20, so that the encrypted area is easily detected after printing.

If the encrypted area is applied with the position detecting markers, the encrypted-area detecting unit 203 can detect the position detecting markers in the encrypted image using a general image-recognition technique such as a pattern matching and an analysis of graphic connectivity, thereby detecting the encrypted area.

Although the pixel values are converted by using the pixel value reverse and the pixel value shift depending on the pixel value of the predetermined pixels that do not belong to the minimum area as shown in FIGS. 6A and 6B in the first embodiment, the present invention is not limited to this method. For example, with reference to FIGS. 6A and 6B, when the input image is black and white, the image processing apparatus can be set to perform only the pixel value reverse as the converting method, with Pmax set at 1, Pmin set at 0, and T0 and T1 set at 0.5. In the case of the black-and-white image, there is not need of computing the average pixel value of the proximate area, and the pixel value can be converted in the same manner as the conventional method.

Although the method of converting the components of the pixel as they are is explained in the first embodiment, the present invention is not limited to this method. Alternatively, the components of the pixel can be converted into another type of components before converting the pixel.

Specifically, the pixel is represented by a brightness component indicative of the degree of the brightness and a color-difference component indicative of a difference between the brightness component and the color component, and both the brightness component and the color-difference component include respective pixel value. The pixel-value converting unit 106 converts the pixel values of one or both of the brightness component and the color-difference component in each pixel that form the minimum area.

For example, as indicated by Equation (6) in FIG. 21, the pixel-value converting unit 106 converts the components of the pixel such as the color components into the brightness component and the color-difference components.

The pixel-value converting unit 106 can convert the pixel values of the brightness component and the color-difference components obtained by converting the red component, the blue component, and the green component. The pixel-value converting unit 106 can then perform computation using the brightness value Y as shown in Equation (7) in FIG. 21, thereby converting it into the red component, the blue component, and the green component.

In this manner, for example, by converting the color components into the brightness component and the color-difference components and further converting the pixel values of the brightness component and the color-difference components, the image processing apparatus according to the second embodiment can realize a sufficient visual change by converting the minimum pixel values, thereby reducing the burden of the pixel converting process and increasing the speed of the converting process.

Furthermore, for example, to convert the pixel value of the color component, if it is hard to realize the sufficient visual change of if it is required to greatly change the pixel value of the color component to realize the sufficient visual change by changing the pixel value of each color component, the image processing apparatus can realize the sufficient visual change by converting the minimum pixel values, thereby reducing the burden of the pixel converting process and increasing the speed of the converting process.

Moreover, though the computing method for converting each pixel in the minimum area is determined based on the pixel values of the pixels that form the area near the minimum area according to the first embodiment, the present invention is not limited to this method. Alternatively, the computing method can be determined based on the average pixel value of the block proximate to the minimum area.

Although whether to issue a warning if the area to be encrypted is not appropriate, such as an inappropriate size, is not mentioned in the first embodiment, the image processing apparatus can issue such a warning.

Specifically, if the image converting unit 105 cannot section the area to be encrypted into a predetermined number of blocks of a predetermined size, the image processing apparatus according to the second embodiment issues a warning. Furthermore, if there are more than a predetermined number of the blocks that include the pixels with the same pixel values, the image processing apparatus issues a warning.

For example, assuming that the number of the blocks in the encrypted area is N and that the number of the blocks that include the same pattern, such as blocks in which all the pixels are white or black, is Nb, the number of the combinations of the encrypted image generated by the pixel converting is obtained by Equation (8) shown in FIG. 21. As a result, the bit length of the encryption key needs to be expressed by Equation (9) shown in FIG. 21.

Therefore, the image processing apparatus according to the second embodiment verifies that the bit length of the encryption key is equal to or shorter than the value expressed by Equation (9) immediately before the process performed by the image converting unit 105, and, if the length of the key does not satisfy Equation (9), the image processing apparatus issues a warning that the encrypted area needs to be broadened or that the area cannot be encrypted. More specifically, if the encrypted area specified at the time of encryption was too small to generate the predetermined number of the blocks, or if the encrypted area is too simple even though the area is large, the image processing apparatus according to the second embodiment issues a warning.

For example, if the image is too small, or if the image is not suitable for the encryption for such a reason that the image is unicolor, the image processing apparatus can issue a message indicating that the encrypted area needs to be broadened or that the area cannot be encrypted.

The significance of issuing such a warning is further explained below. If the number of the blocks generated by sectioning the area to be encrypted is too small, the encrypted data can possibly be decrypted by an incorrect decryption key. Furthermore, if the encrypted area is unicolor, it is meaningless at all to encrypt the area. By issuing a warning in such cases, the image processing apparatus according to the second embodiment can generate an encrypted image sufficiently protected, and save needless processes.

The explanation of the first embodiment includes a first method of converting the pixel values of the pixels that form the minimum area, a second method of selecting the computing method based on the pixels that form the proximate area near the minimum area, a third method of using the computing method that reversibly convert the pixel values, a fourth method of using the computing method that irreversibly convert the pixel values, a fifth method of converting the pixel values using a part or all of the pixel components, and a sixth method of compensating the image. The explanation of the second embodiment includes a seventh method of converting the pixel values after converting the pixel components into another parameter, and an eighth method of issuing a warning.

However, the present invention is not limited to the embodiments, and a part or all of the methods can be employed. For example, the image processing apparatus can employ only the first method of converting the pixel values of the pixels that form the minimum area.

Specifically, the image processing apparatus sections the image to be processed into a plurality of blocks, rearranges the blocks into positions specified by the encryption key that uniquely specifies the position of each block in the image, and converts the pixel values of the pixels that form the minimum area included in the block in the processed image, in which the blocks have been rearranged. In this manner, the image processing apparatus is capable of generating an encrypted image, from which a clear image can be retrieve by decryption.

More specifically, compared with the method of converting the pixel values of all the pixels in the block for encryption and decryption, the image processing apparatus converts the pixel values of only the pixels in the minimum area, thereby reducing the area to be converted. As a result, increase of black pixels due to the black-and-white reversing is suppressed, blur in printing is reduced, and therefore an encrypted image, from which a clear image can be retrieved by decryption, can be generated.

Furthermore, for example, when the encrypted image is printed and the printed image is scanned for decryption, an original image cannot be precisely restored even by converting the pixel values again. However, with the image processing method according to the present invention, the area in which the pixel values need to be converted for the decryption is reduced, thereby generating an encrypted image, from which a clear image can be retrieved by decryption.

Figure 22:
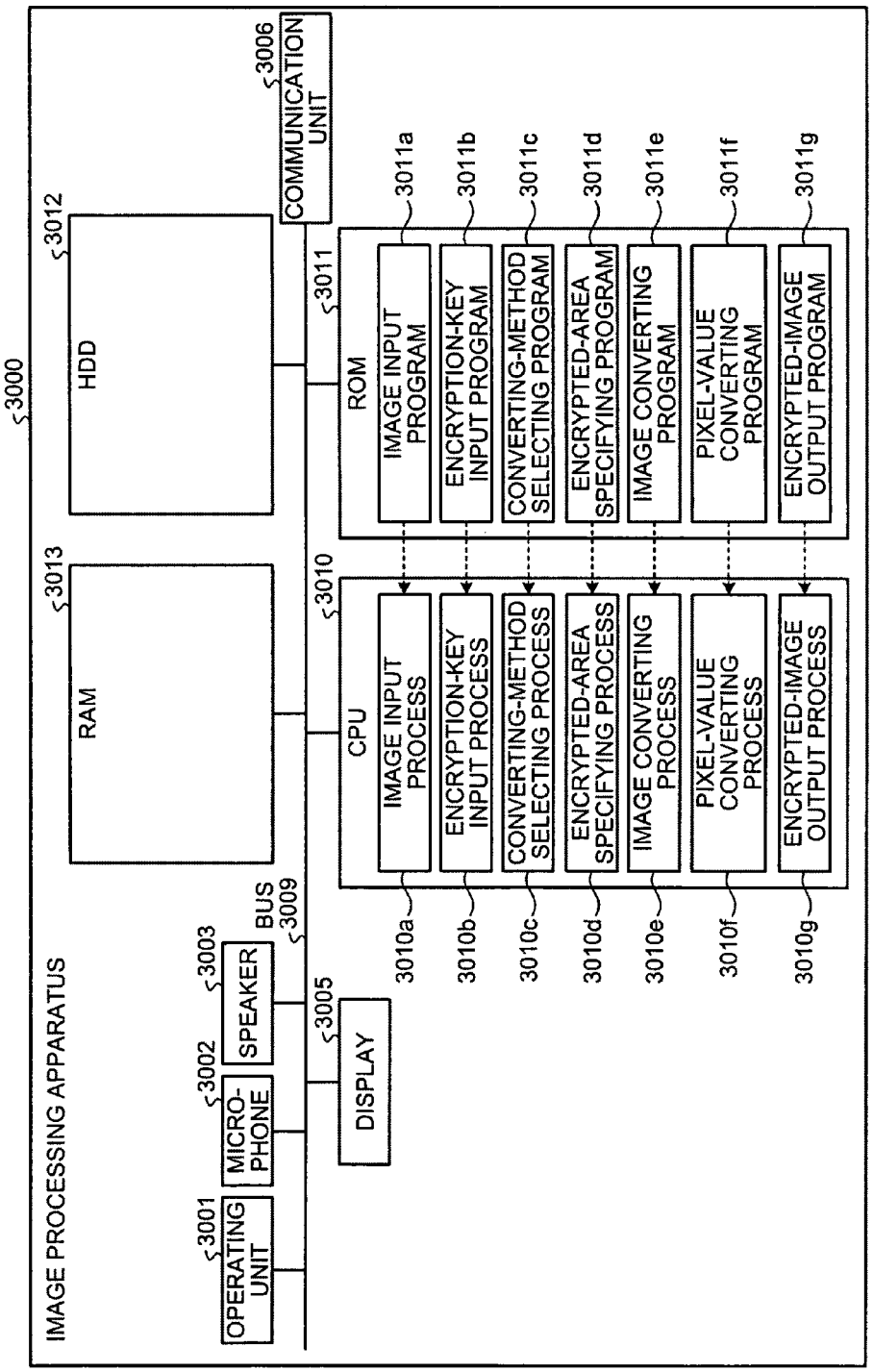
FIG. 22 is a block diagram of a computer that executes an image processing program according to the first embodiment.

In the first embodiment, various processes are performed by hardware logic. However, the present invention is not limited to the hardware logic. Alternatively, the present invention can be realized by executing a previously provided program by a computer. An example of such a computer that executes an image processing program equivalent to the image processing apparatus according to the first embodiment is explained below. FIG. 22 is a block diagram of a computer that executes an image processing program according to the first embodiment.

As shown in FIG. 22, an image processing apparatus 3000 includes an operating unit 3001, a microphone 3002, a speaker 3003, a display 3005, a communication unit 3006, a central processing unit (CPU) 3010, a read only memory (ROM) 3011, a hard disk drive (HDD) 3012, and a random access memory (RAM) 3013, connected to one another with a bus 3019 or the like.

The ROM 3011 stores therein control programs that have the same functions as the image input unit 101, the encryption-key input unit 102, the converting-method selecting unit 103, the encrypted-area specifying unit 104, the image converting unit 105, the pixel-value converting unit 106, and the encrypted-image output unit 107, i.e., an image input program 3011*a*, an encryption-key input program 3011*b*, a converting-method selecting program 3011*c*, an encrypted-area specifying program 3011*d*, an image converting program 3011*e*, a pixel-value converting program 3011*f*, and an encrypted-image output program 3011*g*, as shown in FIG. 22. The programs 3011*a* to 3011*g* can be integrated or separated as needed, like the constituents shown in FIG. 3.

The CPU 3010 reads the programs 3011*a* to 3011*g* from the ROM 3011 and executes them so that they function as an image input process 3010*a*, an encryption-key input process 3010*b*, a converting-method selecting process 3010*c*, an encrypted-area specifying process 3010*d*, an image converting process 3010*e*, a pixel-value converting process 3010*f*, and an encrypted-image output process 3010*g*, as shown in FIG. 22. The processes 3010*a* to 3010*g* respectively correspond to the image input unit 101, the encryption-key input unit 102, the converting-method selecting unit 103, the encrypted-area specifying unit 104, the image converting unit 105, the pixel-value converting unit 106, and the encrypted-image output unit 107.

The CPU 3010 executes the image processing program using data stored in the RAM 3013.

The image processing apparatus explained in the above embodiments can be realized by executing a previously provided computer program by a computer such as a personal computer or a workstation. The computer program can be distributed through a network such as the internet. The computer program can be recorded in a computer readable recording medium such as a hard disk drive, a flexible disk (FD), a compact disk read only memory (CD-ROM), a magnetooptic disk (MO), or a digital versatile disk (DVD) and executed by the computer reading it from the recording medium.

According to an aspect of an embodiment, it is possible to generate an encrypted image that can be decrypted without a conversion error even if the image is degraded.

Furthermore, to decrypt the encrypted image, it is possible to uniquely identify the computing method used for conversion, thereby generating an encrypted image that can be decrypted without a conversion error.

Moreover, if the encrypted image is not converted into analog data, it is possible to completely reverse the pixel value of each pixel that forms the converted minimum area to the original pixel value before conversion.

Furthermore, it is possible to perform decryption on an encrypted image that enables decryption without degrading image quality.

Moreover, it is possible to correctly decrypt a printed encrypted image by restoring the converted pixel value by compensation.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A non-transitory computer program product having a computer readable medium including programmed instructions for image processing, wherein the instructions, when executed by a computer, cause the computer to perform:
    sectioning an image to be processed into a plurality of blocks;
    rearranging the blocks into positions specified by an encryption key that uniquely specifies the positions of the blocks in the image;
    setting a minimum area which is a part of the block and smaller than the block, with respect to each of the blocks rearranged at the rearranging;
    determining a computing method used to convert pixel values of pixels that form the minimum area set at the setting based on statistical characteristics computed from predetermined pixels forming an area near the minimum area and not belonging to the minimum area; and
    converting the pixel values of pixels that form the minimum area based on the computing method determined at the determining without converting pixel values of pixels including the predetermined pixels other than the pixels forming the minimum area in each of the blocks.

2. The non-transitory computer program product according to claim 1, wherein the converting includes using a computing method that reversibly converts the pixel values.

3. The non-transitory computer program product according to claim 1, wherein the converting includes using a computing method that non-reversibly converts the pixel values.

4. The non-transitory computer program product according to claim 1, wherein
    each of the pixels is represented by one or more color components indicative of a color having a value, and
    the converting includes converting a part or all of the color components included in each of the pixels that form the minimum area.

5. The non-transitory computer program product according to claim 1, wherein
    each of the pixels is represented by a brightness component indicative of a degree of brightness and a color-difference component indicative of a difference between the brightness component and a color component indicative of a color, both the brightness component and the color-difference component having a value, and
    the converting includes converting the pixel values of one or both of the brightness component and the color-difference component included in each of the pixels that form the minimum area.

6. The non-transitory computer program product according to claim 1, further causing the computer to perform:
    issuing a first warning when the image to be processed cannot be sectioned into a predetermined number of the blocks with a predetermined size during the sectioning, and
    issuing a second warning when there are more than a predetermined number of the blocks that include pixels having same pixel values.

7. The non-transitory computer program product according to claim 1, wherein,
    the converting includes, when the image is a binary image, converting the pixel values by using converting method, when the image is not a binary image, converting by the pixel values by using the computing method determined at the determining.

8. The non-transitory computer program product according to claim 1, wherein the determining includes determining the computing method based on statistical characteristics computed from the predetermined pixels, the predetermined pixels being pixels of the block proximate to the minimum area.

9. A computer program product having a non-transitory computer readable medium including programmed instructions for image processing, wherein the instructions, when executed by a computer, cause the computer to perform:
    in a converted image generated by sectioning an image into a plurality of blocks, rearranging the blocks, setting a minimum area which is a part of the block and smaller than the block, with respect to each of the rearranged blocks, determining a computing method used to convert pixel values of pixels that form the minimum area set at the setting based on statistical characteristics computed from predetermined pixels forming an area near the minimum area and not belonging to the minimum area, and converting the pixel values of pixels that form the minimum area based on the computing method without converting pixel values of pixels including the predetermined pixels other than the pixels forming the minimum area in each of the rearranged blocks, detecting a position of the minimum area having a converted pixel value by using a filter;
    determining a computing method used to restore the converted pixel value to an original pixel value before the pixel value was converted by the computing method by identifying the computing method for the minimum area;
    restoring the pixel values of the pixels that form the minimum area; and
    reverse-rearranging the blocks in original positions thereof in the image before the blocks were rearranged by using an encryption key.

10. The computer program product according to claim 9, further causing the computer to execute compensating the pixel values of the pixels that form the minimum area having the converted pixel value detected at the detecting using a pixel value computed based on statistical characteristics of the predetermined pixels.

11. The computer program product according to claim 9, wherein the converted image is an image obtained by scanning a printed image.

12. An image processing unit comprising:

a processor coupled to a memory, wherein the processor is programmed to execute:

sectioning an image to be processed into a plurality of blocks;

rearranging the blocks into positions specified by an encryption key that uniquely specifies the positions of the blocks in the image;

setting a minimum area which is a part of the block and smaller than the block, with respect to each of the blocks rearranged at the rearranging;

determining a computing method used to convert pixel values of pixels that form the minimum area set at the setting based on statistical characteristics computed from predetermined pixels forming an area near the minimum area and not belonging to the minimum area; and converting the pixel values of pixels that form the minimum area based on the computing method determined at the determining without converting pixel values of pixels including the predetermined pixels other than the pixels forming the minimum area in each of the blocks.

13. An image processing method comprising:

sectioning an image to be processed into a plurality of blocks;

rearranging the blocks into positions specified by an encryption key that uniquely specifies the positions of the blocks in the image;

setting, using a processor, a minimum area which is a part of the block and smaller than the block, with respect to each of the blocks rearranged at the rearranging;

determining a computing method used to convert pixel values of pixels that form the minimum area set at the setting based on statistical characteristics computed from predetermined pixels forming an area near the minimum area and not belonging to the minimum area; and converting pixel values of pixels that form the minimum area based on the computing method determined at the determining without converting pixel values of pixels including the predetermined pixels other than the pixels forming the minimum area in each of the blocks.

14. An image processing system comprising a first image processing apparatus and a second image processing apparatus, wherein the first image processing apparatus includes a processor coupled to a memory, wherein the processor is programmed to execute:

sectioning an image to be processed into a plurality of blocks;

rearranging the blocks into positions specified by an encryption key that uniquely specifies the positions of the blocks in the image;

setting a minimum area which is a part of the block and smaller than the block, with respect to each of the blocks rearranged at the rearranging;

determining a computing method used to convert pixel values of pixels that form the minimum area set at the setting based on statistical characteristics computed from predetermined pixels forming an area near the minimum area and not belonging to the minimum area; and converting pixel values of pixels that form the minimum area based on the computing method determined at the determining without converting pixel values of pixels including the predetermined pixels other than the pixels forming the minimum area in each of the blocks, and the second image processing apparatus includes a detecting unit that, in the rearranged image, detects a position of a minimum area having a converted pixel value by using a filter, wherein a computing method used to convert the pixel values is determined based on predetermined pixels that do not belong to each of the minimum area;

a determining unit that determines a decryption computing method used to restore the converted pixel value to an original pixel value before the pixel value was converted by the computing method by identifying the computing method for the minimum area;

a restoring unit that restores the pixel values of the pixels that form the minimum area; and a reverse-rearranging that reverse-rearranges the blocks in original positions thereof in the image before the blocks were rearranged by using an encryption key.

* * * * *